United States Patent [19]
Gupta et al.

[11] Patent Number: 5,748,361
[45] Date of Patent: May 5, 1998

[54] FERROELECTRIC CRYSTAL HAVING INVERTED DOMAIN STRUCTURE

[75] Inventors: Mool C. Gupta, Webster; Alan C. G. Nutt; Venkatraman Gopalan, both of Rochester, all of N.Y.

[73] Assignee: Eastman Kodak Company, Rochester, N.Y.

[21] Appl. No.: 686,134

[22] Filed: Jul. 24, 1996

[51] Int. Cl.⁶ .......................................................... G02F 1/37
[52] U.S. Cl. .......................... 359/332; 385/122; 359/328
[58] Field of Search ............................ 385/122; 359/328, 359/332

[56] References Cited

U.S. PATENT DOCUMENTS 5,436,758   7/1995   Agostinelli et al. ................. 385/122 X

OTHER PUBLICATIONS

Kiyoshi Nakamura and Hiroshi Shimizu, "Poling of Ferroelectric Crystals by Using Interdigital Electrodes and its Application to Bulk–Wave Transducers" pp. 527–530, IEEE Ultrasonics Symposium, 1983.

H. Seibert and W. Sohler, "Ferroelectric Micridomain Reversal on Y–cut $LiNbO_3$ Surfaces", SPIE vol. 362, *Physical Concepts of Materials for Novel Optoelectronic Device Applications II: Device Physics and Applications*, 1990, p. 370.

R.A. Rubino, D.E. Bossi, and J.D. Farina, "A Novel Thermal Poling Technique for Fabricating QPM SHG Structures in X–cut Lithium Tantalate" in *Compact Blue–Green Lasers Topical Meeting*, 1992, Optical Society of America, Washington, D. C., 1992, vol. 6, pp. 75–77.

*Primary Examiner*—Vincent P. McGraw
*Attorney, Agent, or Firm*—Raymond L. Owens

[57] ABSTRACT

A method of forming ferroelectric domain regions in a ferroelectric crystal cut so that the polarization direction is in the plane of the crystal and is along the z direction is disclosed. The method includes forming a conductive ground electrode on the surface of the plane and having an edge perpendicular to the z direction or the polarization direction in the crystal plane; and electron beam bombarding the plane of the crystal in particular spots to deposit a charge such that the electric field created between the edge of the electrode and the spots is in a direction opposite to the crystal polarization direction and causing the inversion of the crystal polarization direction between the charge spot and the electrode.

5 Claims, 3 Drawing Sheets

FERROELECTRIC CRYSTAL HAVING INVERTED DOMAIN STRUCTURE

CROSS REFERENCE TO RELATED APPLICATIONS

The present application is related to U.S. application Ser. No. 08/268,373, filed Jun. 29, 1994, by Mool C. Gupta and Alan C. G. Nutt, and entitled "Ferroelectric Light Frequency Doubler Device With a Surface Coating and Having an Inverted Domain Structure" and U.S. application Ser. No. 08/685,133, filed Jul. 24, 1996, by Venkatraman Gopalan and Mool C. Gupta, and entitled "Inverted Domain Structure in Ferroelectric Crystals with Polarization in the Crystal Plane".

FIELD OF THE INVENTION

The present invention relates to devices and a method of making them wherein the devices use inverted ferroelectric domain structure.

BACKGROUND OF THE INVENTION

Commercially available ferroelectric crystals have a uniformly poled electric field domain extending within the crystals between an upper and a lower crystal surface. Such uniform domains do not provide the so-called phase matching properties of the crystal for arbitrary wavelength of light which are required for efficient operation of a ferroelectric light frequency doubler device. In order to provide phase matching in such uniformly poled crystals, various approaches have been developed to generate spatially periodically arranged zones of inverted polarity so that distinct zones with a periodicity of alternating polarity of the domains are provided within the crystal.

Among the approaches useful for generating polarity inverted zones are electron beam exposure, ion beam exposure, proton exchange followed by heat treatment, and inverting some regions of a uniformly prepoled crystal by repoling with an applied electric field.

DISCUSSION OF BLUE LIGHT

Using these periodic domain gratings, various devices such as frequency conversion lasers, acousto-optic devices, piezoelectric and pyroelectric devices have been made in ferroelectric materials. As an example, here we shall briefly discuss the application of periodic domain gratings for fabricating a solid state blue laser.

A feature of the ferroelectrics such as $LiNbO_3$, $LiTaO_3$ and KTP is that they exhibit non-linear optical properties like second harmonic generation. When a light of infrared wavelength (say 840 nm) is passed through these crystals in specific orientations, they generate light of double the frequency of the input light (in this case, 420 nm blue light). The efficiency of conversion of the infrared to blue light depends on the non-linear coefficients of the materials, the length of the material traversed, and most importantly, the relative phase velocities of the infrared and the blue light in the material. If these two velocities are different, then the infrared and the blue light keep getting in and out of phase with each other and there is little net conversion of infrared light to blue light. Although the non-linear coefficient of these materials is high, the phase velocities of infrared and blue lights is different. Phase matching of specific wavelength of infrared light can be achieved by passing infrared light along specific orientation of the crystal. However, if the infrared light travels across a periodically domain reversed grating, the phase velocity mismatch can be overcome to result in high conversion efficiencies of infrared to blue. The period of domain reversed grating can be chosen to phase match arbitrary wavelength of infrared light.

Electron beam and ion beam exposure have evolved as one of the preferred approaches to generate spatially periodically arranged zones or domains of alternating polarity, and hence, the desirable phase matching property, in a ferroelectric crystal, because such beams can be provided with relatively small beam diameter, for example, with a beam diameter in the range between about 0.3 micrometer and about 1.5 micrometers, by commercially available electron beam or ion beam generating means. Such beam generating means also frequently includes beam scanning means or beam deflection means, so that an electron or ion beam can be scanned across one surface of a uniformly poled ferroelectric crystal at spatially periodic intervals, thereby inducing spatially periodic domains of alternating polarity within the crystal.

$LiNbO_3$, $LiTaO_3$ and KTP have been used with periodic domain inversion for development of new lasers using frequency conversion technique. These crystals have been poled in Z direction (thickness direction) by applying voltage along z direction or by writing by e-beam on negative Z face. The waveguides formed by proton exchange process in $LiNbO_3$ or $LiTaO_3$ can only support TM polarization, wherein incident beam polarization is along z direction. Laser diodes used for frequency conversion are TE polarized (polarization along the horizontal direction).

To use TM polarization, laser diode has to be 90 degree rotated. For laser array application, 90 degree rotation is not practical and it is desired to have waveguide which can support TE polarization.

PREVIOUS WORK IN POLING X-CUT AND Y-CUT CRYSTALS

It is a problem to fabricate a periodic domain grating on X-cut and Y-cut crystals. Some of the main difficulties in this area have been (a) in electric field poling, applying very high fields (~20KV/mm) on the crystal surface without the breakdown of medium between the electrodes on the surface; (b) requiring high temperature processes for domain reversal; (c) not sufficient depth of the domain reversed regions (only ~0.2 μm) in the thickness direction of the crystal; (d) inability to fabricate domain gratings with very small periods (~3–4 μm); and (e) involved processes requiring long times and cost of fabrication.

Nakamura and Shimizu (see Kiyoshi Nakamura and Hiroshi Shimizu, "Poling of Ferroelectric Crystals by Using Interdigital Electrodes and its Application to Bulk-Wave Transducers" p 527–530, IEEE Ultrasonics Symposium, 1983) reported domain reversal in X-cut and Y-cut lithium tantalate crystals using interdigital electrodes on the surface and heating the sample above its Curie temperature (~600° C.) and subsequent cooling. The grating was used for acousto-optic device. One fundamental problem with this technique is that one cannot achieve a periodic reversed grating useful for frequency conversion. Secondly, the sample requires to be heated above the curie temperature where the ferroelectricity is lost. On cooling down, only selected areas where electric field is applied regains a single domain orientation. The other areas remain multidomain which means the polarization points in all random directions in these areas.

Seibert and Sohler (see H. Seibert and W. Sohler, "Ferroelectric Micridomain Reversal on Y-cut $LiNbO_3$ Surfaces", SPIE vol. 362, *Physical Concepts of Materials for Novel Optoelectronic Device Applications II: Device Physics and Applications*, 1990, p 370) used pyroelectric fields developed on the surface of the $LiNbO_3$ crystals on heating and cooling the crystal rapidly, to reverse domains in selected areas near the surface. Two metal pads were formed on the surface of a Y-cut crystal with a gap of ~6 μm between them. Upon heating to high temperatures and cooling down rapidly, a field is developed between the two metal pads which is opposite to the polarization direction and hence reverses the domain orientation between the pads. With this technique, they demonstrated domain gratings of 6.5 μm period. The main drawbacks of this technique are that the depth of the reversed domains were very shallow (<0.5 μm). Further, high temperature operation is required with rapid heating and cooling rates which is undesirable. The grating period demonstrated is still too large for making a quasi-phase matched blue laser.

Recently Rubino et al (see R. A. Rubino, D. E. Bossi, and J. D. Farina, "A Novel Thermal Poling Technique for Fabricating QPM SHG Structures in X-cut Lithium Tantalate" in *Compact Blue-Green Lasers Topical Meeting*, 1992, Optical Society of America, Washington, D.C., 1992, vol. 6, pp 75–77) reported fabricating a ~9 μm period domain grating on X-cut $LiTaO_3$ by a combination of electric field and thermal heating. Two electrodes with a spacing of 200 μm were deposited on the surface of the crystal and a field of 1KV/mm was applied across them. Using a laser beam of ~10.6 μm wavelength, the crystal was heated in selected areas to temperatures above 600° C. which is the curie temperature of $LiTaO_3$. While cooling under the applied field, the domain in that region reverses its polarization direction. They also fabricated a waveguide across a third order domain grating and obtained an efficiency of ~3%/W-$cm^2$. Although the efficiency is low, this was the first reported blue laser device on X-cut $LiTaO_3$. The problems with this technique are that (a) one requires a sophisticated laser and a scanning mechanism; (b) crystal requires heating to over 600° C.; (c) the domain were crescent shaped and difficult to control and (d) only third order grating (~9 μm) period was demonstrated. Smaller periods are difficult with this technique.

SUMMARY OF THE INVENTION

It is therefore an object of the invention to provide an improved method for making inverted ferroelectric devices with reversing or inverting domain regions.

Another object of this invention is to provide a waveguide structure with a period grating which can effectively convert IR light to blue light.

The above objects are achieved in a method of forming ferroelectric domain regions in a ferroelectric crystal cut so that the polarization direction (Z direction) is in the plane of the crystal, comprising the steps of:

a) forming a conductive ground electrode on the surface of the plane and having an edge perpendicular to the z direction or the polarization direction, in an X-cut or Y-cut crystal plane; and b) electron beam bombarding the plane of the crystal in particular spots to deposit a charge such that the electric field created between the edge of the electrode and the spots is in a direction opposite to the crystal polarization direction and causing the inversion of the crystal polarization direction between the charge spot and the electrode.

ADVANTAGES

It is an advantage of the present invention to provide a method for formation of periodic domain inversion in plane so that laser diode array can be used for nonlinear frequency conversion and single laser diode does not need to be rotated 90. It is another advantage of the invention to provide a structure which can be used for laser array applications wherein 90 degree rotation is not practical and it is desired to have waveguide which can support TE polarization.

Other important features and advantages of this invention are:

a) it is a room temperature process, no crystal heating is required;

b) an ordinary scanning electron microscope can be used for this technique;

c) the writing technique is very fast (order of seconds);

d) the reversed domain depth can be controlled by the amount of charge deposited at a spot on the crystal surface, by controlling the energy of the electron beam, the scan rate and the dwell time of the electron beam spot; and e) domain reversal grating of periods of a period of a few microns can be easily fabricated.

DETAILED DESCRIPTION

Figure 1:
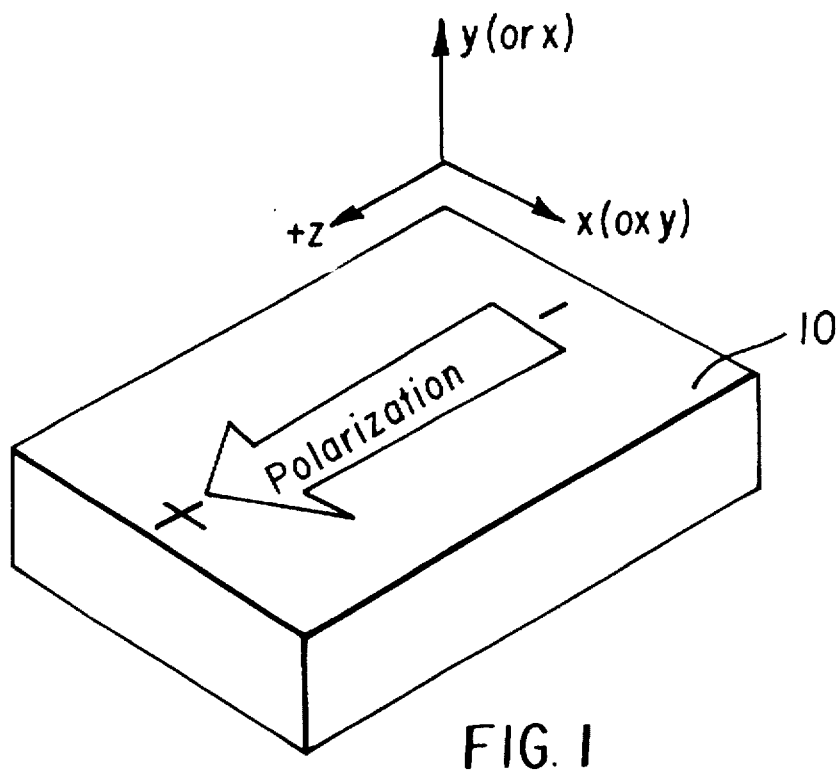
FIG. 1 shows the crystal orientation used and the polarization direction with respect to crystal axes.

FIG. 1 shows a ferroelectric crystal 10 which has an X- or Y-cut. The term X-cut, for example, means that the crystal surface is perpendicular to the X-axis of the crystal. The term Y-cut similarly means that the crystal surface is perpendicular to the Y-axis. In the X-cut situation, the top crystal plane is called the X-plane or surface and with a Y-cut, the top crystal plane is called the Y-plane or surface. Either can be used effectively in accordance with this invention. The important requirement for the electron beam writing technique described below is that the intrinsic ferroelectric polarization direction (defined as being along the Z-axis of the crystal) is in the plane of the crystal. The direction of polarization is indicated by the wide arrow in FIG. 1 and the "+" and the "−" signs indicating the signs of the dipole charges giving rise to the polarization in the crystal. Typical crystal dimensions which can be used in accordance with this invention are: thickness t: 0.5 mm, width along Z-axes: 5 mm, width perpendicular to Z-axis: 5 mm. The thickness, t, and the width along the Z-axis are not critical. The width perpendicular to the Z-axis determines the final length of the device and hence the device efficiency. Various ferroelectric materials such as $LiTaO_3$, $LiTaO_3$, and KTP can be used in accordance with this invention.

Figure 2:
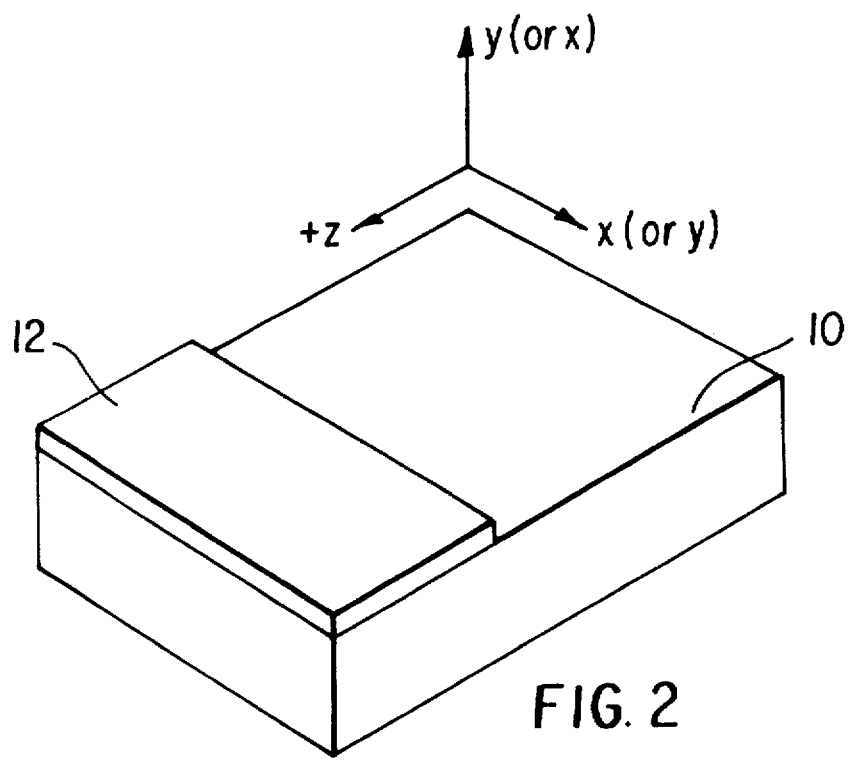
FIG. 2 shows a thin conducting film deposited on the crystal x or y plane with an edge perpendicular to polarization axis.

Turning to FIG. 2, the first step in the writing process is to deposit a conductive electrode pad 12 on the crystal surface as shown in FIG. 2. The surface is a Y surface or plane in a Y-cut crystal and an X surface or plane in an X-cut crystal. The deposition process used can be electron-beam deposition, RF-magnetron sputtering, or thermal evaporation. Typical thickness of the electrode pad used is ~100 nm and the width of the electrode pad along the Z-axis used is ~2.5 mm. The conductive electrode pad 12 can be formed of a metal such as aluminum, gold, or silver or a conducting oxide.

Figure 3:
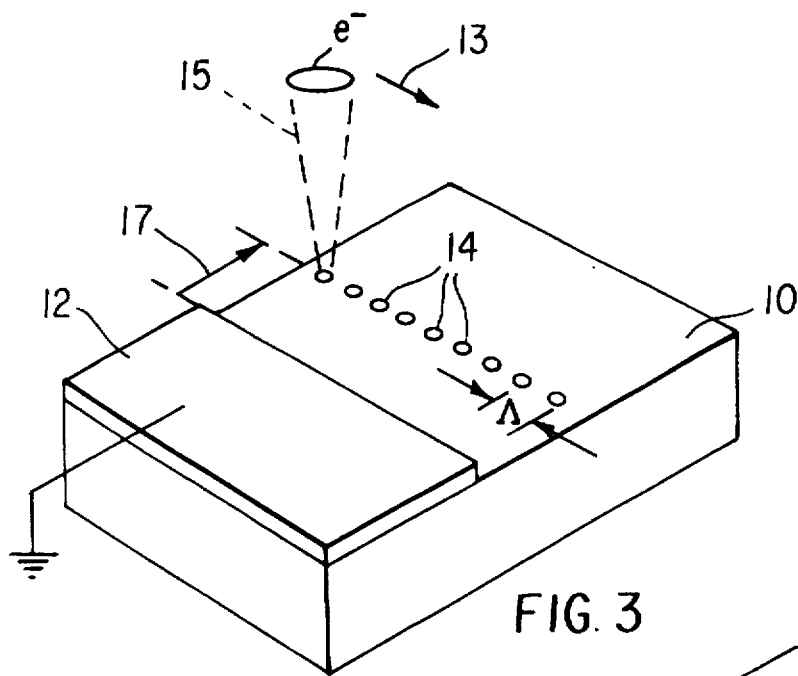
FIG. 3 shows the electron-beam writing process and the direction of the electric field generated by the electron beam and the conducting pad.

FIG. 3 shows the electron beam writing process. The writing is done using a Scanning Electron Microscope (SEM) or a Scanning Transmission Electron Microscope (STEM). An accelerating voltage of 20 to 30 KeV and a beam current of 5–10 nA was used. The electron beam spot size used in an embodiment of this invention was ~500 nm. The beam is positioned at a fixed distance (can vary from 500 nm to a few millimeters) from the electrode edge such that on viewing from top of the writing surface, the crystal polarization direction was pointed from the electron beam position towards the edge of the conductive electrode pad 12. The conductive electrode pad 12 was electrically grounded. The electron beam (e−) is now scanned parallel to the edge of the conductive electrode pad 12 at a given fixed distance from the pad as shown in FIG. 3.

The scan direction arrow is labeled 13. The scanning scheme of the beam 15 is as follows: starting from one edge of the crystal, the electron beam dwells at a given spot 14 (indicated by small circles on the crystal surface in FIG. 3) for a fixed amount of time, then skips over a interspot distance of Λ (grating period) along the movement direction, and then exposes the crystal again and so on until the end of the crystal is reached. Typical exposure times are in microsecond range for LiTaO₃ crystals. The distance between two spots is equal to the required period of domain grating for the device. For example, in LiTaO₃ Y-cut crystals used for quasi-phase matched blue light generation of 420 nm wavelength from an infrared beam of 840 nm, the period of domain grating required is Λ=3.6 µm.

Figure 4A:
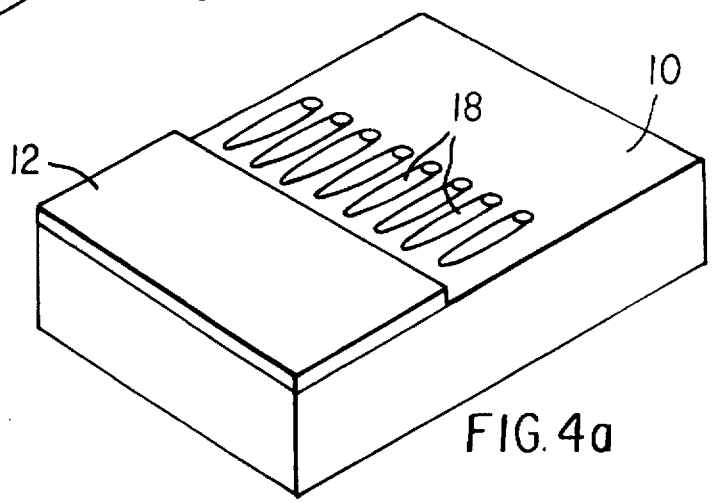
FIG. 4a and FIG. 4b. show respectively, the isometric and plan views of the inverted domains due to the electron beam with respect to the conducting pad and the crystal axes.
Figure 4B:
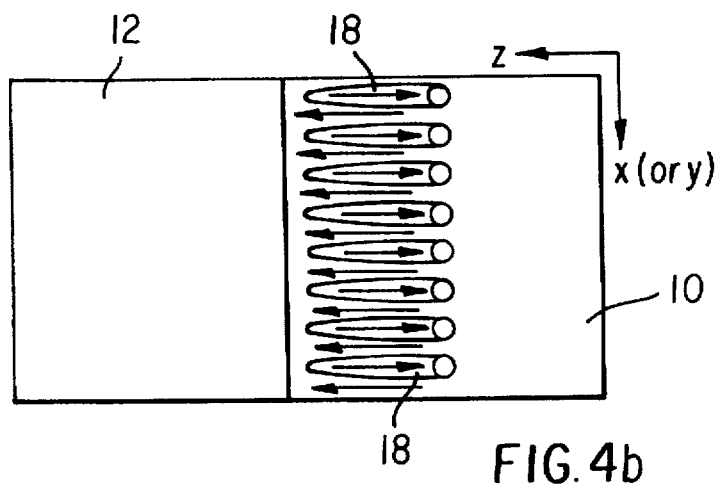

In the region between the electron beam exposed spot 14 on the crystal and the grounded conductive electrode pad 12, an electric field is created pointing from the electrode towards the electron beam spot 14. This is shown by a field arrow. Since this direction is opposite to the polarization direction in the ferroelectric crystal 10, the crystal polarization direction is reversed in that region. Thus a domain inverted grating with a period Λ is created on the crystal plane or surface as shown in FIG. 4a and FIG. 4b. The inverted domains are labeled 18. The typical lengths of these domain inverted regions in the polarization direction is ~100 to 300 µm in LiTaO₃ Y-cut crystals. More particularly, FIG. 4a shows an isometric view and FIG. 4b shows a plan view. For clarity of illustration, the polarization arrows are only shown in FIG. 4b and they, of course, alternate with those caused by the electric field being in one direction and those caused by the crystal polarization unacted upon by the electric field being in the opposite direction. This arrangement provides the periodic domain grating structure described above. It will also be understood that after the charge is deposited on spots 14, it will eventually dissipate, but the polarization change will have become permanent.

Figure 5A:
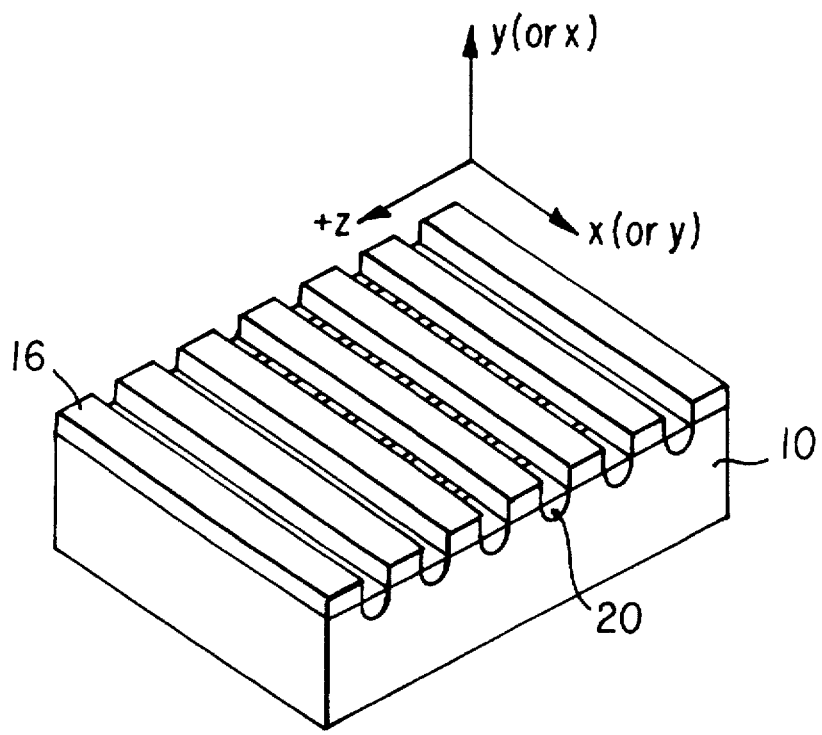
FIG. 5a and FIG. 5b show the waveguide formation on the inverted domain regions by lithography.
Figure 5B:
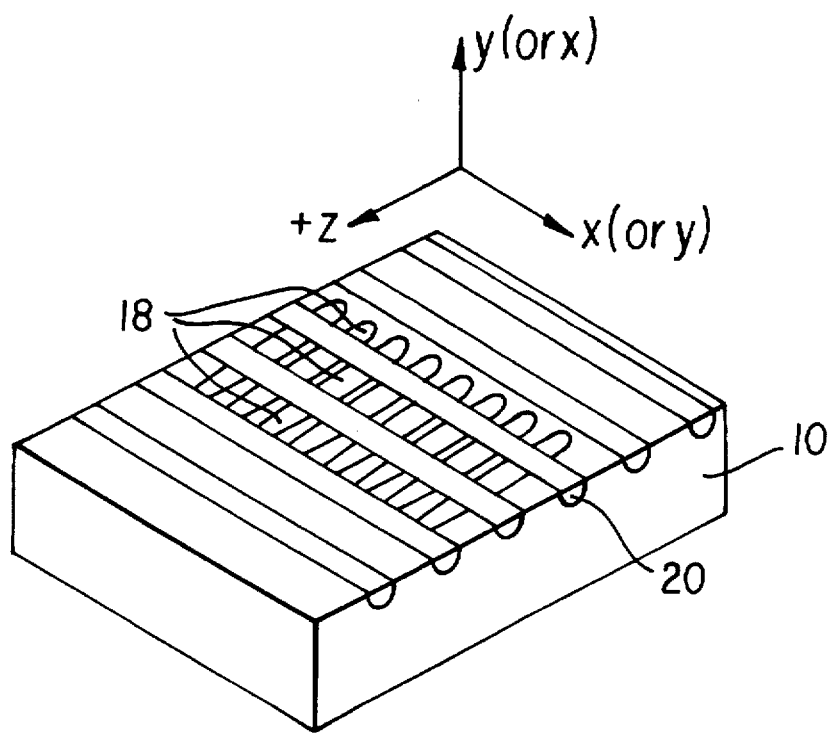

Having obtained a periodic domain grating, light guiding waveguides are fabricated on the crystal surface perpendicular to the polarization direction as shown in FIG. 5a and FIG. 5b. The first step is to strip the conductive electrode pad 12 from the crystal surface which can be performed by chemical etching using appropriate chemicals or by physically removing the conductive electrode pad 12 by polishing. Next tantalum film 16 is deposited on the entire crystal surface by rf-magnetron sputtering. Typically, this film 16 can have a thickness of 50 nm. Although tantalum is used, it will be understood that other materials can also be used in forming the waveguide mask. Using standard photolithographic technique of photoresist coating, baking, UV-exposure of the resist through a physical mask, developing the resist followed by argon ion etching to remove tantalum metal between the photoresist lines and then stripping the photoresist off, a tantalum grating is created on the crystal surface with grating lines perpendicular to the polarization axis of the crystal as shown in FIG. 5a. This structure is next ion-exchanged in areas between the tantalum lines where the crystal surface is exposed. This process involves dipping the crystal in appropriate exchange solutions and heating it at a fixed temperature for desired amount of time. For example, when LiTaO₃ crystals are immersed in benzoic acid with 0.1 to 1 mole percent lithium benzoate and heated to 200°–300° C. for 1–10 hours, excellent results are achieved. This increases the refractive index of the crystal in the ion exchanged areas 20 compared to the regions that are protected by tantalum metal film 16. Finally, the tantalum metal film 16 is stripped off the crystal surface using a chemical etch, and edges are polished for a waveguide device as shown in FIG. 5b. The areas of the crystal that are of interest are where the domain inverted regions and the ion exchange areas 20 cross each other. In operation IR light is guided by ion exchange areas 20 across the periodic system to produce blue light. It is a particular feature of this invention that, after the formation of periodic domain inversion, a laser diode array can be used for nonlinear frequency conversion and single laser diode does not need to be rotated 90 as discussed in the background of the present invention.

In an example of this invention, a Y-cut LiTaO₃ crystal was cut into a small dimension of 9 mm×9 mm. An aluminum metal film of 3 mm width and 9 mm long was deposited on the Y-surface of the crystal. The metal surface was connected to a ground electrode. An electron beam was scanned at about 1 mm distance from the metal surface such that the electric field formed between the −ve charge deposited by electron beam and ground electrode was in the opposite direction of polarization field. The electron beam was scanned such that the charge was deposited at every 3.6 micron spacing. Due to high electric field between −ve charge and metal electrode a polarization direction reversal was observed where the charge was deposited. The charge deposited area was about one micron in dimension but polarization reversal was observed about 50 micron along the metal direction and about one micron in width direction. This allowed the formation of a periodic domain reversal grating in LiTaO₃ where domain reversal is in plane. The depth of domain reversal region was found to be about 3 microns. Similar results can be achieved with X-cut crystal using exactly the method described above.

The invention has been described with reference to a preferred embodiment. However, it will be appreciated that variations and modifications can be effected by a person of ordinary skill in the art without departing from the scope of the invention.

| PARTS LIST | |
|---|---|
| 10 | ferroelectric crystal |
| 12 | conductive electrode pad |
| 13 | beam scanning direction |
| 14 | spot |
| 15 | electron beam |
| 16 | tantalum metal film |

PARTS LIST

| | |
|---|---|
| 17 | field arrow |
| 18 | inverted domains |
| 20 | ion exchange areas |

We claim:

1. A method of forming ferroelectric domain regions in a ferroelectric crystal cut so that the polarization direction (Z direction) is in the plane of the crystal, comprising the steps of:

a) forming a conductive ground electrode on the surface of the plane and having an edge perpendicular to the z direction or the polarization direction, in an X-cut or Y-cut crystal plane; and b) electron beam bombarding the plane of the crystal in particular spots to deposit a charge such that the electric field created between the edge of the electrode and the spots is in a direction opposite to the crystal polarization direction and causing the inversion of the crystal polarization direction between the charge spot and the electrode.

2. The method according to claim 1 wherein the crystal is formed of $LiTaO_3$ or $LiNbO_3$ or KTP.

3. A method of forming a waveguide structure having ferroelectric domain regions in a ferroelectric crystal cut so that the polarization direction (Z direction) is in the X-cut or Y-cut plane of the crystal, comprising the steps of:

a) forming a conductive ground electrode on the surface of the plane and having an edge perpendicular to the Z direction or the polarization direction in the crystal plane;

b) electron beam bombarding the plane of the crystal in particular spots to deposit a charge such that the electric field created between the edge of the electrode and the spots is in a direction opposite to the crystal polarization direction and causing the inversion of the crystal polarization direction between the charge spot and the electrode to thereby provide a periodic domain grating; and c) forming a waveguide in the crystal perpendicular to the periodic domain grating.

4. The method of claim 3 further including illuminating the input of the waveguide with infrared radiation so that blue light exits from the waveguide.

5. The method according to claim 3 wherein the crystal is formed of $LiTaO_3$ or $LiNbO_3$ or KTP.

* * * * *

UNITED STATES PATENT AND TRADEMARK OFFICE
CERTIFICATE OF CORRECTION

PATENT NO. : 5,748,361
DATED : May 5, 1998
INVENTOR(S) : Mool C. Gupta, et al

It is certified that error appears in the above-identified patent and that said Letters Patent is hereby corrected as shown below:

Title page, insert the following:

--Related U.S. Application Data
[60] Provisional application No. 60/005,690, Oct. 13, 1995--

Column 1, line 2, insert the following:

--CROSS REFERENCE TO RELATED APPLICATION
Reference is made to and priority claimed from U.S. Provisional application Ser. No. US 60/005,690, filed Oct. 13, 1995, entitled FERROELECTRIC CRYSTAL HAVING INVERTED DOMAIN STRUCTURE.--.

Signed and Sealed this

Ninth Day of February, 1999

Attest:

*Attesting Officer*

*Acting Commissioner of Patents and Trademarks*